US009128495B2

(12) United States Patent
Freier et al.

(10) Patent No.: US 9,128,495 B2
(45) Date of Patent: Sep. 8, 2015

(54) USER INTERFACE FOR CONTROLLING A BATHROOM PLUMBING FIXTURE

(75) Inventors: Donald P. Freier, Sheboygan, WI (US); Rafael A. Rexach, Kohler, WI (US)

(73) Assignee: KOHLER CO., Kohler, WI (US)

( * ) Notice: Subject to any disclaimer, the term of this patent is extended or adjusted under 35 U.S.C. 154(b) by 297 days.

(21) Appl. No.: 13/012,193

(22) Filed: Jan. 24, 2011

(65) Prior Publication Data
US 2011/0169786 A1 Jul. 14, 2011

Related U.S. Application Data (63) Continuation of application No. 11/737,864, filed on Apr. 20, 2007, now Pat. No. 7,889,187.

(51) Int. Cl.
*G05D 23/13* (2006.01)
*G06F 3/0482* (2013.01)
*G06F 3/0484* (2013.01)

(52) U.S. Cl.
CPC .......... *G05D 23/1393* (2013.01); *G06F 3/0482* (2013.01); *G06F 3/04847* (2013.01)

(58) Field of Classification Search
CPC ..... G06F 3/02; G06F 3/0482; G06F 3/04847; G05D 23/1393
USPC ........ 345/156–184; 4/541.2–541.3, 545–546, 4/559, 597, 601–605, 614, 695; 700/17, 700/19, 65–66, 83–85, 302; 340/524, 340/686.1–688; 251/129.01, 129.11, 205, 251/208; 341/32, 35; 324/207.25
See application file for complete search history.

(56) References Cited

U.S. PATENT DOCUMENTS

| | | | |
|---|---|---|---|
| 3,317,829 | A | 5/1967 | Kuhrt et al. |
| 3,711,672 | A | 1/1973 | Moreland et al. |
| 3,867,652 | A | 2/1975 | Bjorklund et al. |
| 4,054,860 | A | 10/1977 | Henderson et al. |
| 4,054,861 | A | 10/1977 | Markison |
| D253,044 | S | 10/1979 | Hewson |

(Continued)

FOREIGN PATENT DOCUMENTS

| | | |
|---|---|---|
| EP | 0 313 913 | 5/1989 |
| JP | 2006171355 | 6/2006 |

OTHER PUBLICATIONS

Kohler.com, "The Bold Look of Kohler Catalog" pages, Kohler Co.
(Continued)

*Primary Examiner* — Temesgh Ghebretinsae
*Assistant Examiner* — Keith Crawley
(74) *Attorney, Agent, or Firm* — Foley & Lardner LLP (57) ABSTRACT

A plumbing fixture is operated by a user interface that has an enclosure with a faceplate from which a pedestal seamlessly projects outward. An alphanumeric display is visible through the faceplate and a plurality of switches respond to the user pressing different portions of the faceplate. A selector includes a selector ring that has a plurality of permanent magnets and which is positioned to rotate around the pedestal. A Hall effect sensor of the selector is located adjacent the selector ring and produces an electrical signal in response to motion of the permanent magnets. The user interface also enables the selection of a plurality of predefined operating configurations for the plumbing fixture. An optional wireless remote control may be provided by which the user can activate and deactivate the plumbing fixture and select from among the predefined operating configurations.

18 Claims, 4 Drawing Sheets

(56) References Cited

U.S. PATENT DOCUMENTS

| | | |
|---|---|---|
| 4,199,741 A | 4/1980 | Serrus Paulet |
| 4,415,856 A | 11/1983 | Welles |
| 4,420,811 A | 12/1983 | Tarnay et al. |
| 4,682,728 A | 7/1987 | Oudenhoven et al. |
| 4,756,030 A | 7/1988 | Juliver |
| 4,812,804 A | 3/1989 | Masaki |
| 4,854,498 A | 8/1989 | Stayton |
| 4,854,499 A | 8/1989 | Neuman |
| 4,869,427 A | 9/1989 | Kawamoto et al. |
| 4,901,915 A | 2/1990 | Sakakibara |
| 4,909,435 A | 3/1990 | Kidouchi et al. |
| 4,923,116 A | 5/1990 | Homan |
| 4,945,943 A | 8/1990 | Cogger |
| 4,965,894 A | 10/1990 | Baus |
| 4,974,636 A | 12/1990 | Cogger |
| 5,058,804 A | 10/1991 | Yonekubo et al. |
| 5,121,511 A | 6/1992 | Sakamoto et al. |
| D344,684 S | 3/1994 | Metz et al. |
| 5,294,045 A | 3/1994 | Harris |
| 5,358,177 A | 10/1994 | Cashmore |
| 5,414,879 A | 5/1995 | Hiraishi et al. |
| 5,428,850 A | 7/1995 | Hiraishi et al. |
| D381,313 S | 7/1997 | Krajci et al. |
| 5,757,180 A | 5/1998 | Chou et al. |
| D402,571 S | 12/1998 | Pasquarette et al. |
| 5,920,131 A | 7/1999 | Platt et al. |
| 5,936,613 A | 8/1999 | Jaeger et al. |
| 5,944,531 A | 8/1999 | Foley et al. |
| 5,979,775 A | 11/1999 | Raya |
| 5,979,776 A | 11/1999 | Williams |
| 6,101,451 A | 8/2000 | Smith et al. |
| 6,188,332 B1 * | 2/2001 | Scarlata ............................ 341/35 |
| D440,207 S | 4/2001 | Carson et al. |
| 6,225,980 B1 | 5/2001 | Weiss et al. |
| 6,233,757 B1 | 5/2001 | Graham et al. |
| 6,250,558 B1 | 6/2001 | Dogre Cuevas |
| 6,286,764 B1 | 9/2001 | Garvey et al. |
| 6,438,770 B1 | 8/2002 | Hed et al. |
| D462,253 S | 9/2002 | Caveney et al. |
| 6,498,326 B1 | 12/2002 | Knappe |
| 6,812,435 B2 | 11/2004 | Schilling |
| 6,879,863 B2 | 4/2005 | Mueller et al. |
| 6,925,661 B1 | 8/2005 | Anger |
| D509,127 S | 9/2005 | Millward et al. |
| D523,823 S | 6/2006 | McLellan et al. |
| 7,084,859 B1 | 8/2006 | Pryor |
| 7,126,072 B2 | 10/2006 | Saitoh |
| D548,049 S | 8/2007 | Millward et al. |
| D553,096 S | 10/2007 | Pfingsten et al. |
| 7,281,214 B2 | 10/2007 | Fadell |
| 7,369,850 B2 | 5/2008 | Andrew et al. |
| D580,951 S | 11/2008 | Niizawa et al. |
| 7,504,598 B2 | 3/2009 | Weigold |
| D591,182 S | 4/2009 | Schoenherr et al. |
| D598,305 S | 8/2009 | Li et al. |
| D607,571 S | 1/2010 | Pratt |
| 7,642,886 B2 | 1/2010 | Boss |
| D612,274 S | 3/2010 | Heidemann et al. |
| D613,627 S | 4/2010 | Wang |
| D613,994 S | 4/2010 | Murphy et al. |
| 7,705,838 B2 | 4/2010 | Kinerk et al. |
| D615,624 S | 5/2010 | Allard et al. |
| D628,678 S | 12/2010 | Allard et al. |
| 7,860,536 B2 | 12/2010 | Jobs et al. |
| D633,522 S | 3/2011 | Trabona et al. |
| D642,894 S | 8/2011 | Soper et al. |
| D658,519 S | 5/2012 | Connolly et al. |
| D666,508 S | 9/2012 | Beland et al. |
| D667,450 S | 9/2012 | Eby et al. |
| D667,460 S | 9/2012 | Wujcik et al. |
| D667,739 S | 9/2012 | Saitou |
| D669,865 S | 10/2012 | Gilbert et al. |
| D673,176 S | 12/2012 | Phelan |
| 8,358,278 B2 | 1/2013 | Lim et al. |
| 8,416,198 B2 | 4/2013 | Rathnam et al. |
| D681,654 S | 5/2013 | Hirsch et al. |
| D684,872 S | 6/2013 | Bias et al. |
| D685,657 S | 7/2013 | Hu |
| D688,696 S | 8/2013 | Phelan |
| D699,130 S | 2/2014 | Rhodes et al. |
| D699,596 S | 2/2014 | Hu |
| D700,849 S | 3/2014 | Bremenkamp |
| 2003/0027545 A1 | 2/2003 | Tobishima |
| 2003/0229404 A1 * | 12/2003 | Howard et al. ............... 700/17 |
| 2004/0046795 A1 * | 3/2004 | Josephson et al. ............ 345/764 |
| 2004/0204779 A1 * | 10/2004 | Mueller et al. ............... 700/83 |
| 2004/0257068 A1 | 12/2004 | Wolber et al. |
| 2006/0071917 A1 | 4/2006 | Gomez et al. |
| 2007/0159316 A1 | 7/2007 | Mischel et al. |
| 2007/0226645 A1 | 9/2007 | Kongqiao et al. |
| 2008/0271238 A1 | 11/2008 | Reeder et al. |
| 2010/0020012 A1 | 1/2010 | Oh |

OTHER PUBLICATIONS

Kohler.com, "Bodies of Water Design Catalog" pages, Kohler Co.
10 pages of a PCT search report in a counterpart application PCT/US2007/009770.
Official Action dated Apr. 27, 2010 in European Patent Application No. 07 775 954.6 that corresponds to the above-identified U.S. patent application.
Non-Final Office Action for U.S. Appl. No. 29/431,717, mail date May 30, 2014, 14 pages.
First Examination Report for Indian Patent Application No. ELEC/2014/1549, dated Dec. 11, 2014, 2 pages.
Office Action on U.S. Appl. No. 29/431,717 Dated Dec. 11, 2014, 7 pages.

* cited by examiner

USER INTERFACE FOR CONTROLLING A BATHROOM PLUMBING FIXTURE

CROSS-REFERENCE TO RELATED APPLICATIONS

This application is a continuation of U.S. patent application Ser. No. 11/737,864 that was filed on Apr. 20, 2007 now U.S. Pat. No. 7,889,187.

STATEMENT REGARDING FEDERALLY SPONSORED RESEARCH OR DEVELOPMENT

Not Applicable

BACKGROUND OF THE INVENTION

1. Field of the Invention

The present invention relates to plumbing fixtures, such as bathroom showers and whirlpools, and more particularly to an electrical control system for operating components of the plumbing fixture and specifically to a user interface of the control system.

2. Description of the Related Art

High end bathroom shower systems provide multiple showerheads mounted on the ceiling and walls of a shower enclosure to direct water onto the bather from multiple directions. Some of these showerheads are similar to those found in standard single showerhead showers, while others provide unconventional spray patterns. For example, the WaterTile (trademark Kohler Co.) showerhead has 22 nozzles that provide a series of water cascades, while other showerheads emit water in a sheet flow. Such a shower enclosure typically has several different types showerheads to provide a variety of water flow effects.

The water flow to each showerhead is individually controlled by a separate electrically operated valve. In addition to regulating the on/off flow rate, the valve can provide a constant flow or a pulsated flow to produce a massaging effect replicating the rhythmic manipulation of tissue performed by a masseur or masseuse. The different electrically operated valves also can be opened and closed sequentially to create continuously changing water patterns within the shower enclosure.

The bathing experience is further enhanced by a plurality of different colored lamps that are independently controlled to produce light of varying intensity and color in the shower enclosure. Speakers also provide music, radio news programs and other audio performances to the bather. A steam generator may turn the shower enclosure into a steam bath, when desired.

Because of the relatively large number of functions that are provided on a top of the line shower system, its operation is governed by a microcomputer based control system. While such computerized control simplifies the hardware necessary to operate all the valves, lights, audio equipment, steam generator and other shower components, the bather still has to select which of the numerous functions are to be active and choose parameters for the selected functions. Heretofore, this required a complex user control panel.

Thus, there is a need for a simple, easy to use interface by which the bather is able to individually control the numerous functions on a state of the art shower system. Because the interface is intended for location in a wet environment, it must be watertight.

SUMMARY OF THE INVENTION

A user interface produces signals for controlling a plumbing fixture, such as a shower system for example, that has electrically operated components. The user interface includes an enclosure that has a faceplate with an exterior surface. A display is provided on which alphanumeric characters, symbols and icons are presented to a user of the plumbing fixture. The display is visible through the exterior surface of the faceplate.

Several user operable input devices are incorporated into the enclosure. A plurality of switches respond to the user pressing a different portion of the faceplate. A selector has a pedestal that projects outward from and is affixed to the faceplate in a watertight manner. A selector ring is rotatably positioned around the pedestal and contains a plurality of permanent magnets arranged annularly, A Hall effect sensor is located adjacent the selector ring and produces an electrical signal in response to motion of the selector ring.

In a preferred embodiment of the user interface, a controller receives the electrical signal from the Hall effect sensor and determines from that signal whether the selector ring is rotating clockwise or counterclockwise around the pedestal.

Another aspect of the present user interface is a wireless remote control by which the user also is able to control the plumbing fixture. The a wireless remote control comprises a first switch for activating and deactivating the plumbing fixture, a second switch for selecting one of a plurality of preset operating configurations for the plumbing fixture, and a visual indicator designating which of the plurality of preset operating configurations has been selected.

DETAILED DESCRIPTION OF THE INVENTION

Although the present invention is being described in the context of controlling a bathroom shower system, it has equal applicability to controlling a whirlpool tub, toilet, or other plumbing fixture. The term "plumbing fixture" as used herein includes a water enclosure, such as a tub, shower enclosure or toilet, as well as the plumbing fittings and components that control the flow of water to and from the water enclosure. However, "plumbing fixture" does not include white goods, such as clothes washing machines, dishwashers and the like.

Figure 1:
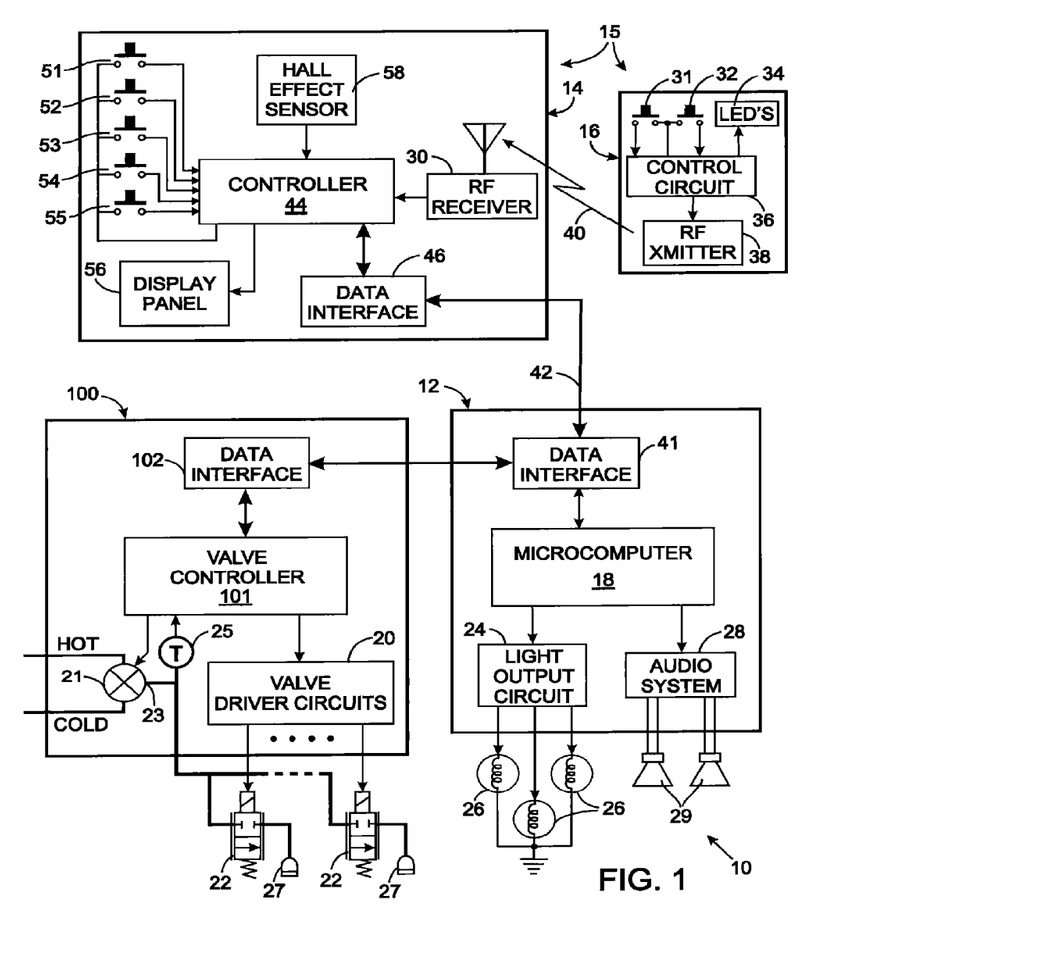
FIG. 1 is a block schematic diagram of an electronic control system for operating a plumbing fixture.

With initial reference to FIG. 1, a control system 10 electrically operates various components of a shower system, such as valves that control the flow of water to a plurality of shower heads, different colored lights within the shower enclosure, and an audio system that provides music or radio programming to the bather. The control system 10 includes a primary controller 12, a user control panel 14, and a wireless remote control 16. The user control panel 14 and wireless remote control 16 collectively form a user interface 15 for the control system. In a typical installation, the primary controller 12 is mounted within a wall adjacent to the shower enclosure and the user control panel 14 is located on a wall of that shower enclosure for access by the bather.

The primary controller 12 is based around a commercially available microcomputer 18 that includes a processor, a memory for storing control programs and data and input/output circuits for interfacing with other components of the primary controller. Other outputs of the microcomputer 18 are connected to a light output circuit 24 that controls the application of electricity to a plurality of light bulbs 26 mounted in the ceiling and walls of the shower enclosure. The microcomputer 18 also controls the operation of an audio system 28 with speakers 29 mounted within the shower enclosure. The audio system 28 comprises equipment for providing music, radio programming, or other types of audio from different sources and is controlled by the bather via the user control panel 14. The microcomputer 18 communicates via data interface 41 to a data interface 102 in a digital valve 100.

The digital valve 100 has a valve controller 101 with outputs connected to a plurality of valve driver circuits 20 that provide signals for operating a plurality of valves 21 and 22. A mixing valve 21 selectively combines water from hot and cold sources to produce water at an outlet 23 that has a temperature desired by the bather. That temperature is measured by a sensor 25 which provides a temperature indication signal to the valve controller 101. The mixing valve outlet 23 is connected to a several solenoid operated valves 22 that control the flow of water to the different shower heads 27 within the shower enclosure. Each solenoid operated valve may feed one or more shower heads. The valve controller 101 also can open and close the valve in a rapid sequence to provide a pulsed flow of water to the shower head 27.

The user control panel 14 exchanges control signals with the primary controller 12 through a cable 42. Specifically one end of the cable 42 is connected to a first data interface 41 in the primary controller 12 and the opposite end is coupled to a second data interface 46 in the user control panel 14. The two data interfaces 41 and 46 convert data between a parallel format used with the user control panel 14 and the primary controller 12 and a serial format by which the data are transmitted over the cable. The user control panel 14 is based around a controller 44 that includes a microprocessor and a memory for storage of a control program and data. The controller 44 has ports connected to user input and output devices of the user control panel.

Figure 2:
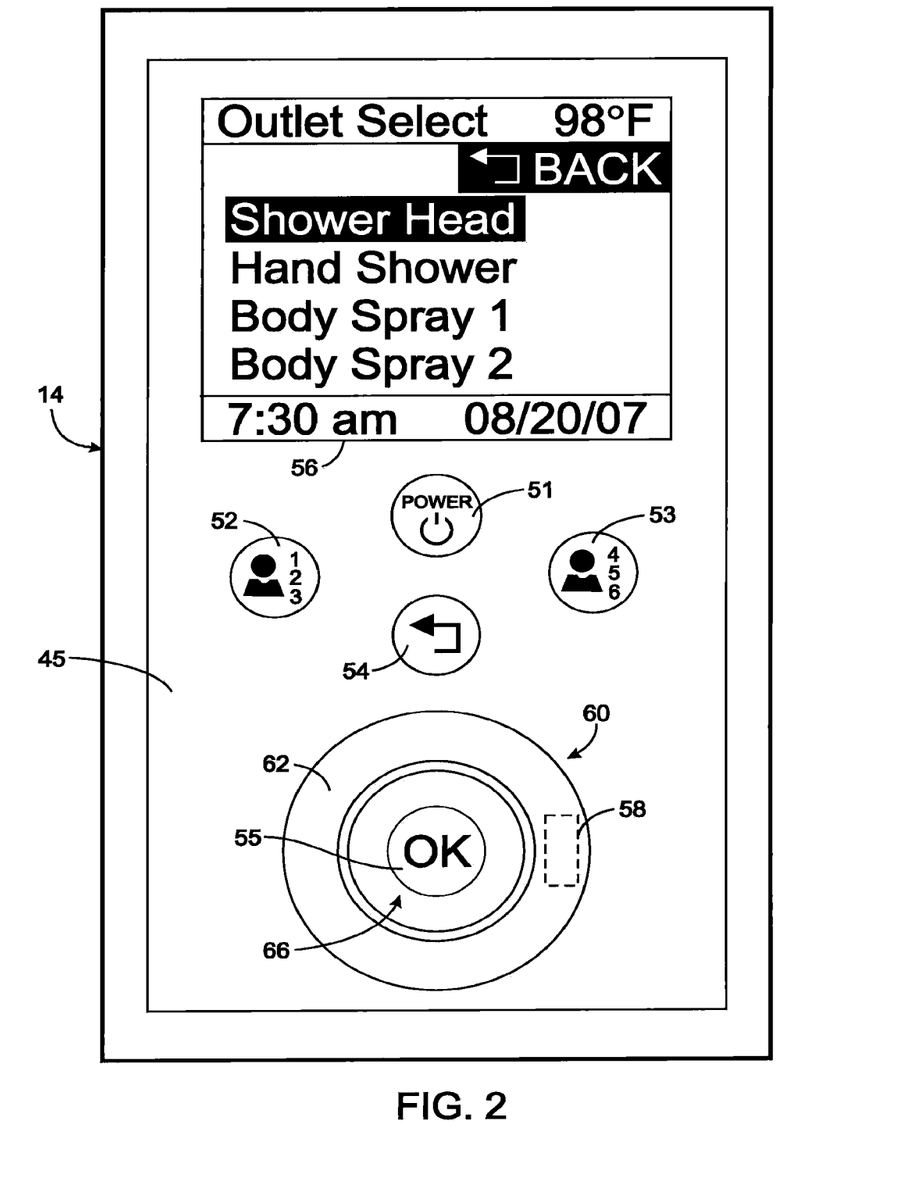
FIG. 2 illustrates the faceplate of a user interface for the control system.

With additional reference to FIG. 2 which shows the faceplate 45 of the user control panel 14, the controller 44 is connected to a plurality of momentary contact switches 51, 52, 53, and 54, such as capacitive switches or membrane switches integrated into the exterior surface of the faceplate. The momentary contact switches and the arrangement of other input/output devices on the faceplate 45, as will be described, avoid the need for holes in the control panel faceplate 45, and thus prevent water within the shower enclosure from penetrating into the user control panel 14. The first momentary contact switch 51 toggles the control system 10 between on and off states. Second and third momentary contact switches 52 and 53 enable a bather to select one of six different preset operating configurations of the shower system which have been previously stored in the control system 10. For example, after a bather has manually set up the shower system to provide a particular water pattern, lighting, and audio selection, that entire operating configuration can be stored as one of the six preset operating configurations. On a subsequent use of the shower enclosure, the bather can restore the shower system to that one of those preset operating configuration by using either the second or third momentary contact switch 52 or 53. The bather selects a particular preset operating configuration by pressing the appropriate switch 52 or 53 a respective number of times. For example, to select the fifth stored configuration, the bather presses the third momentary contact switch 53 twice. This enables different people to quickly set up the shower system according to their individual preferences. It also enables the same person to have several preset operating configurations to use at different times, such as a morning shower, a workout shower, and an evening shower.

The user control panel 14 has a display 56, such as an LCD panel, on which alphanumeric characters and symbols are displayed to the bather. The control panel faceplate 45 has a transparent section that extends over the display in a seamless manner thereby providing a watertight exterior surface of the faceplate so that water can not penetrate into the user control panel. A fourth momentary contact switch 54 returns information on the display 56 to a previous information screen, as will be described. The user control panel 14 also includes a rotary selector 60 that is used for a number of input functions depending upon the particular information being presented on the display 56. For example, in FIG. 2 the display 56 contains a list of four different water outlet devices, i.e. a spray head, a hand shower, and two body sprays, that are operated by the control system 10. By rotating a selector ring 62 of the selector 60, an input signal is sent to the controller 44 to cause the displayed information to sequentially highlight each of the four output devices in reversed fonts. For example, FIG. 2 shows the Shower Head highlighted which highlighting designates that particular item of information shown on the display. The selector ring 62 can be rotated either clockwise or counterclockwise to respectively move the highlighting down and up the displayed list, respectively. The bather can select the highlighted item by pressing a fifth momentary contact switch 55 in the center of the selector 60. That action signals the controller 44 that the bather has selected the presently highlighted item being displayed. As will be described in greater detail, the selector ring 62 has a plurality of permanent magnets that activate a commercially available Hall effect sensor 58 located behind the control panel faceplate 45 to provide a signal to the controller 44 that indicates not only motion of the selector ring 62, but the clockwise or counterclockwise direction of that motion.

Figure 3:
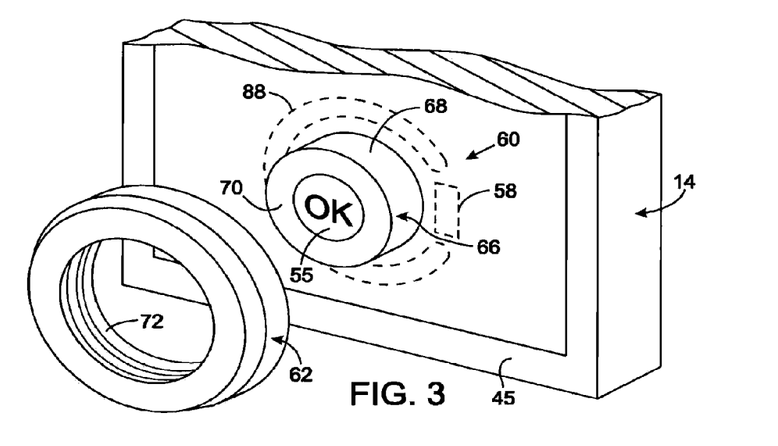
FIG. 3 illustrates a selector ring of a rotary input device that has been removed from the user interface.

The selector 60 has a unique physical construction which enables the faceplate 45 to have a continuous, uninterrupted exterior surface, that does not have any holes or other openings, thereby preventing water from entering the user control panel 14. With particular reference to FIG. 3, the selector 60 comprises a circular, cylindrical pedestal 66 projecting outward from the faceplate 45 in a seamless manner thereby providing a watertight exterior surface of the faceplate. Preferably, the faceplate 45 and the pedestal 66 are molded as a single piece of plastic. The pedestal 66 has a curved side surface 68 and a flat end surface 70 on which the fifth momentary contact switch 55 is mounted. The fifth momentary contact switch 55, along with the other four switches on the faceplate 45, are membrane type switches integrated into the exterior surface of the faceplate 45, thereby also enabling that surface to be contiguous and unbroken.

With continuing reference to FIGS. 2 and 3 the selector ring 62, the selection ring, which is removable from the faceplate 45, has an interior circumferential surface 72 with a diameter that is slightly larger than the exterior diameter of the pedestal 66. This arrangement allows the selector ring 62 to be rotated around the pedestal 66.

Figure 4:
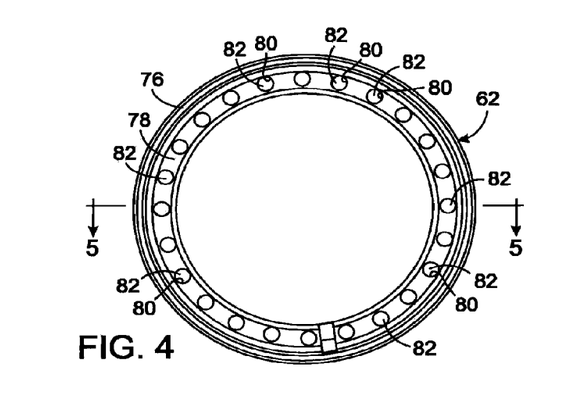
FIG. 4 is a view of one flat face of the control ring.
Figure 5:
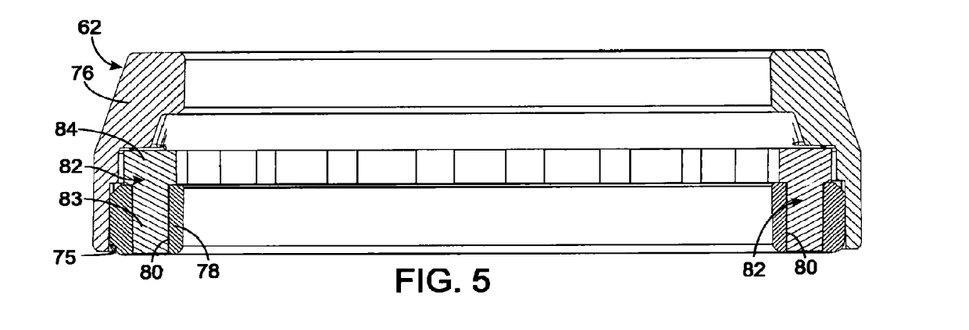
FIG. 5 is a cross sectional view along line 5-5 in FIG. 4.

With reference to FIGS. 4 and 5, the selector ring 62 has an outer annular shell 76 that has a bore 75 within which an annular magnet retainer 78 fits and is held therein by snap tabs, adhesive or other fastening technique. The magnet retainer 78 has a plurality of apertures 80 extending between its two planar surfaces and a separate permanent magnet 82 is received within each aperture. Every permanent magnet 82 has a round shaft 83 projecting through the respective aperture 80 and a head 84, at an interior end of the shaft, which head is held between the shell 76 and the magnet retainer 78 when those latter components are secured together. The magnet head 84 prevents the magnets from sliding completely through the apertures 80. The opposite, exterior end of the shaft 83 of each permanent magnet 82 is exposed through the opening of the aperture 80 on a first side 85 of the selector ring 62. There are an even number of permanent magnets 82 arranged circumferentially around the selector ring 62 with their north and south poles alternating. Specifically if the north pole of a given permanent magnet is exposed on the first side 85 of the selector ring, and the adjacent permanent magnets on both sides of that given magnet have their south poles exposed on the first side. For example, there are 24 permanent magnets spaced a 15° increments annularly around the selector ring 62. The Hall effect sensor 58, such as model A3425 from Allegro MicroSystems, Inc. of Worcester, Mass. 01606 U.S.A., has two active Hall effect elements spaced closer together than the magnet spacing so that only one element at a time senses a permanent magnet as the selector ring rotates around the pedestal. This enables the controller 44 to determine the direction that the selector ring 62 is rotating from the Hall effect sensor signal.

As shown in FIG. 3, a C-shaped body 88 of magnetic material, such as steel, is embedded in the control panel faceplate 45 around the pedestal 66. The Hall effect sensor 58 is located at the opening of that C-shaped body. In a preferred embodiment of the present invention, the C-shaped body 88 is molded into the plastic of the faceplate 45, but alternatively it can be secured to either the inner or outer surface of the faceplate by adhesive or other fastening technique which does not penetrate entirely through the faceplate. As a result, when the selector ring 62 is placed around the pedestal 66, many of the permanent magnets 82 are attracted to the C-shaped body 88, thereby holding the selector ring against the faceplate 45. Thus the same magnets 82 which are used by the Hall effect sensor 58 to detect motion of the selector ring 62 also hold that selector ring in place on the faceplate 45. However, this magnetic attraction allows a bather to pull the selector ring 62 away from the faceplate 45 for cleaning and other purposes. Because the user control panel 14 is intended to be mounted vertically or horizontally on a shower enclosure wall, the pedestal 66 passing through the selector ring 62 also aids in holding the selector ring in place against the force of gravity.

With reference again to FIG. 2, the exemplary information presented on the display 56 illustrates the outlet selection menu, which provides a list of the different shower heads and other water outlets in the shower enclosure. The bather is able to scroll up or down through this list by rotating the selector ring 62 counterclockwise or clockwise, respectively, about the pedestal 66. That rotational movement is detected by the Hall effect sensor 58 to provide a signal that is sent to the controller 44 within the user control panel 14. In response to that signal, the controller changes the item in the list of water outlets that is highlighted for selection by the bather. More than four water outlets can be scrolled through with designations of additional outlets appearing as the bath scrolls upward from the top of the list or downward from the bottom of the list.

Figure 6:
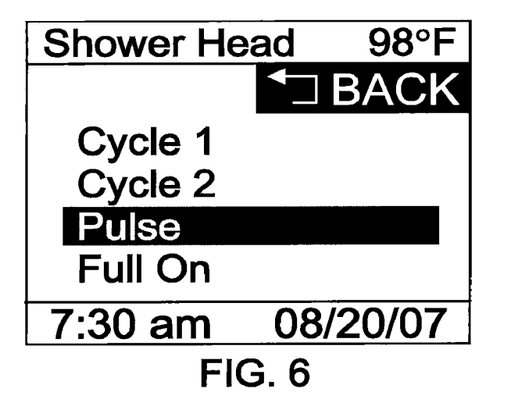
FIGS. 6 and 7 depict different types of information being presented on a display of the user interface.

When the desired water outlet is highlighted by reversed font, the bather indicates that desired selection by pressing the fifth momentary contact switch 55 at the center of the pedestal 66. This turns on the solenoid valve 22. As used herein the term "information screen" refers to the information being presented on the display 56 and not to the hardware of that display device. On the new information screen, the bather can now scroll through a number of water flow patterns to select the one that is desired for the selected water outlet, in this case the pulsing flow from the shower head. Near the upper right corner of the information screen in FIG. 6, is an indication that by pressing the return, or fourth, momentary contact switch 54 on the user control panel, the display will return to the previous information screen, in this case the outlet selection screen shown in FIG. 2. Other information screens, such as one for programming the preset operating configurations, can be accessed from a main system menu screen to which access is gained by pressing the return momentary contact switch 54 a sufficient number of times.

Figure 7:
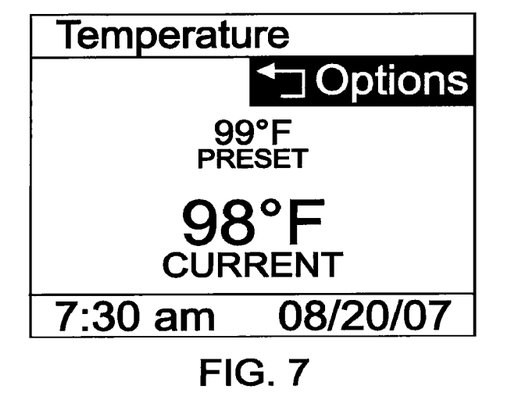

The information screen in FIG. 2 indicates that by pressing the return, or fourth, momentary contact switch 54, a temperature control screen shown in FIG. 7 will be displayed. For this information screen, the display 56 presents the current temperature of the water flowing through the various outlets and the preset temperature that the bather has indicated previously is desired for that flow. When this information screen is presented on the display 56, rotation of the selector ring 62 increases or decreases the preset, or desired, temperature depending upon the direction of that rotation. This designated preset temperature is conveyed from the user control panel 14 to the primary controller 12, and particularly to the microcomputer 18. In response, the microcomputer 18 sends data through the data interface 41 to the data interface 102 in the digital valve 100. The valve controller 101 uses this information to alter the position of the mixing valve 21 to change the ratio of hot and cold supply water to produce a desired outlet temperature for the water sent to the individual control valves 22. The valve controller 101 also receives a signal from the temperature sensor 25 indicating the outlet water temperature and responds to that sensor signal also by operating the mixing valve 21 to achieve the desired temperature.

Figure 8:
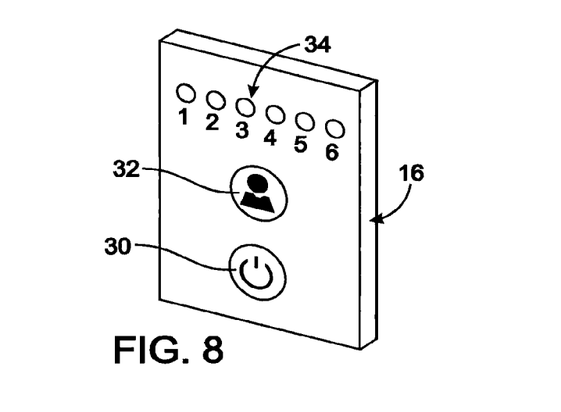
FIG. 8 is a perspective view of a wireless remote control for the shower control system.

With reference to FIGS. 1 and 8, a bather also is able to initiate operation of the shower system using a hand-held, remote control 16 that transmits commands to a radio frequency (RF) receiver 30 within the user control panel 14. The wireless remote control 16 has a pair of momentary contact switches 31 and 32 for respectively turning on and off the control system 10 and selecting from among the plurality of preset operating configurations of the shower system. The selection of a particular preset operating configuration is indicated by a plurality of light emitting diodes (LED's) 34. The switches 31 and 32 and the light emitting diodes 34 are connected to a control circuit 36 that responds to the activation of those switches by providing a digital code to a radio frequency transmitter 38. The radio frequency transmitter 38 modulates a radio frequency carrier signal with that digital data and transmits the resultant RF signal 40 to the radio frequency receiver 30 within the user control panel 14.

Pressing the first momentary contact switch 31 on the remote control, alternately turns the control system 10 on and off. For example, the bather is able to turn on the shower system while in bed so that the water temperature will reach the desired level by the time the bather enters the shower enclosure. The second momentary contact switch 32 on the remote control 16 is employed to select one of the six preset operating configurations for the shower system. Repeatedly pressing the second momentary contact switch 32 through each of the six preset operating configurations with the LED's 34 indicating the number of the currently designated configuration. After the bather has illuminated the LED corresponding to the desired preset operating configuration, the bather releases the second momentary contact switch 32. When the designation of a preset operating configuration remains unchanged for a given period of time, e.g. five seconds, the control circuit 36 sends a digital code indicating that preset operating configuration to the radio frequency transmitter 38. That digital code then is transmitted via the radio frequency signal 40 to the RF receiver 30 within the user control panel 14.

The RF receiver decodes the radio frequency signal 40 and extracts the digital code indicating the selected preset operating configuration which is then sent to the controller 44. In response to the receipt of that selection, the microcomputer 18 communicate to the digital valve 100 which in turn operates the water valves 21 and 22, the light bulbs 26, and the audio system 28 according to the information stored previously for that selected preset operating configuration. Therefore, the remote control 16 allows the bather to set up the shower system for a desired bathing experience before entering the shower enclosure where the user control panel 14 is located.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A user interface which produces electrical signals for controlling a plumbing fixture, said user interface comprising:
   an enclosure having a faceplate with an exterior surface and a pedestal projecting outward from and fixedly attached to the faceplate;
   a display for presenting information to a user of the plumbing fixture, wherein the display is visible through the exterior surface of the faceplate;
   a selector having a selector ring positioned to rotate around the pedestal and containing an annular arrangement of a plurality of permanent magnets, and having a Hall effect sensor located adjacent the selector ring and producing an electrical signal in response to motion of the plurality of permanent magnets;
   a magnetic ring embedded in a fixed position beneath the exterior surface around the pedestal and configured to attract the annular arrangement of permanent magnets, wherein the magnetic ring pulls the annular arrangement of permanent magnets toward the exterior surface using magnetic force to hold the selector ring to the user interface, wherein the Hall effect sensor is embedded beneath the exterior surface within an opening in the magnetic ring, wherein each of the plurality of permanent magnets in the selector ring magnetically engages the magnetic ring and the Hall effect sensor in sequence as the selector ring rotates;
   a controller connected to the display and the Hall effect sensor, wherein the controller causes multiple different graphical menus to be presented on the display, each of the multiple different graphical menus comprising a plurality of selectable shower control options presented concurrently on the display, wherein at least one of the shower control options is displayed with highlighting; and
   a data interface connected to the controller, wherein the controller uses the data interface to send commands to a valve controller for a plurality of shower valves, wherein the controller is configured to use the commands for the valve controller to make shower adjustments in response to selections made on the display via the selector, wherein rotation of the selector ring moves the highlighting from one of the shower control options to another of the shower control options presented concurrently on the display and causes the controller to make multiple different shower adjustments based on which of the multiple different graphical menus are presented on the display.

2. The user interface of claim 1, wherein the pedestal projects from the exterior surface without forming a seam in the exterior surface of the faceplate.

3. The user interface of claim 1, wherein the controller is configured to cause the display to show a menu with shower valving options for highlighting via the selector.

4. The user interface of claim 1, wherein the controller is configured to present audio and lighting options to be selected via the display and selector.

5. The user interface of claim 1, further comprising:
   a wireless receiver for receiving audio, lighting, or shower control selections from a wireless transmitter.

6. A user interface which produces electrical signals for controlling a plumbing fixture, said user interface comprising:
   a seamless front panel extending over an LCD display panel;
   at least one selector control coupled with the front panel without creating a seam in the front panel, the at least one selector control comprising a selector ring containing an annular arrangement of a plurality of permanent magnets and a Hall effect sensor located adjacent the selector ring, the Hall effect sensor producing an electrical signal in response to motion of the plurality of permanent magnets;
   a magnetic ring embedded in a fixed position beneath the seamless front panel and configured to attract the annular arrangement of permanent magnets, wherein the magnetic ring pulls the annular arrangement of permanent magnets toward the seamless front panel using magnetic force to hold the selector ring to the user interface, wherein the Hall effect sensor is embedded beneath the seamless front panel within an opening in the magnetic ring, wherein each of the plurality of permanent magnets in the selector ring magnetically engages the magnetic ring and the Hall effect sensor in sequence as the selector ring rotates;
   a controller connected to the LCD display panel and the at least one selector control, wherein the controller causes multiple different graphical menus to be displayed on the LCD display panel, each of the multiple different graphical menus comprising a plurality of selectable shower control options presented concurrently on the LCD display panel, wherein at least one of the shower control options is displayed with highlighting;
   a data interface connected to the controller, wherein the controller uses the data interface to send commands to a valve controller for a plurality of shower valves, wherein the controller is configured to use the commands for the valve controller to make shower adjustments in response to selections made on the graphical menus via the selector, wherein selections made on the graphical menus via the selector move the highlighting from one of the shower control options to another of the shower control options presented concurrently on the display and cause the controller to make multiple different shower adjustments based on which of the multiple different graphical menus are presented on the LCD display panel.

7. The user interface of claim 6, further comprising:
an RF receiver, wherein the controller is configured to interpret command signals received via the RF receiver and to adjust shower valves in response to the interpreted commands signals.

8. The user interface as recited in claim 6 further comprising:
a pedestal extending from the front panel; and
a switch located on a top surface of the pedestal.

9. A user interface for a shower, said user interface comprising:
a seamless front panel extending over an LCD display panel;
at least one selector control coupled with the front panel without creating a seam in the front panel, the at least one selector control comprising a selector ring containing an annular arrangement of a plurality of permanent magnets and a Hall effect sensor located adjacent the selector ring, the Hall effect sensor producing an electrical signal in response to motion of the plurality of permanent magnets;
a magnetic ring embedded in a fixed position beneath the seamless front panel and configured to attract the annular arrangement of permanent magnets, wherein the magnetic ring pulls the annular arrangement of permanent magnets toward the seamless front panel using magnetic force to hold the selector ring to the user interface, wherein the Hall effect sensor is embedded beneath the seamless front panel within an opening in the magnetic ring, wherein each of the plurality of permanent magnets in the selector ring magnetically engages the magnetic ring and the Hall effect sensor in sequence as the selector ring rotates;
a controller connected to the LCD display panel and the at least one selector control, wherein the controller causes multiple different graphical menus to be displayed on the LCD display panel for controlling the shower, each of the multiple different graphical menus comprising a plurality of selectable shower control options presented concurrently on the LCD display panel, wherein at least one of the shower control options is displayed with highlighting, wherein selections made on the graphical menus via the selector move the highlighting from one of the shower control options to another of the shower control options presented concurrently on the display and cause the controller to make multiple different shower adjustments based on which of the multiple different graphical menus are presented on the LCD display panel.

10. The user interface of claim 9, wherein the controller causes at least one command to be generated which causes a light for the shower to change states.

11. The user interface of claim 10, wherein the controller causes a temperature to be displayed on the LCD display panel and changed via the selector, and wherein the controller causes signals for a valving system to be adjusted to achieve the changed temperature.

12. The user interface of claim 9, further comprising:
a wireless receiver connected to the controller and configured to provide control signals received via RF to the controller.

13. The user interface of claim 9, wherein the controller causes audio to be played back via at least one speaker for the shower.

14. The user interface of claim 9, further comprising:
a temperature sensor communicably coupled to the controller and configured to sense the temperature of the shower water.

15. The user interface of claim 14, wherein the controller uses the sensed temperature of the shower water to cause the LCD display to update a display of the shower water temperature.

16. The user interface of claim 15, wherein the controller uses input from the at least one selector control to change the shower water temperature.

17. The user interface of claim 16, wherein the different graphical menus comprise a first menu for changing the water temperature and a second menu for changing a pulse pattern of the shower water.

18. The user interface of claim 17, wherein the different graphical menus are configured to allow the selector to be used to control at least three different shower subsystems.

* * * * *